Figure 1:
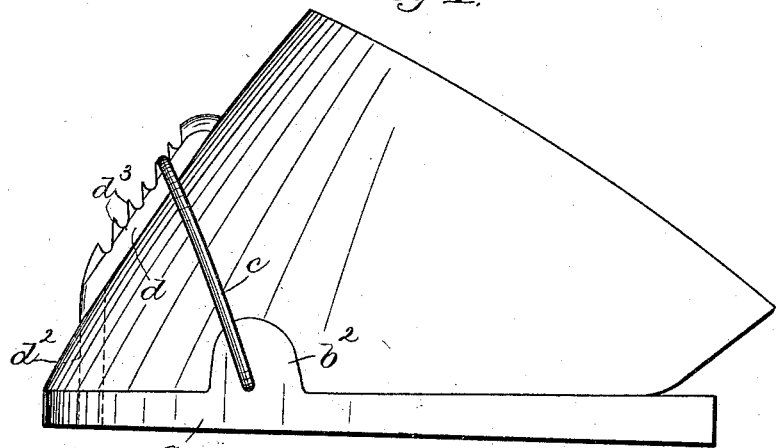

(No Model.)

E. T. COVELL.
FASTENING FOR HORSESHOES.

No. 513,360. Patented Jan. 23, 1894.

Witnesses
Jas. J. Maloney
M. E. Gill

Inventor
Edward T. Covell
by Jno. P. Livermore
Att'y

THE NATIONAL LITHOGRAPHING COMPANY,
WASHINGTON, D. C.

UNITED STATES PATENT OFFICE.

EDWARD T. COVELL, OF NEW BEDFORD, MASSACHUSETTS.

FASTENING FOR HORSESHOES.

SPECIFICATION forming part of Letters Patent No. 513,360, dated January 23, 1894.

Application filed March 15, 1893. Serial No. 466,023. (No model.)

*To all whom it may concern:*

Be it known that I, EDWARD T. COVELL, of New Bedford, county of Bristol, State of Massachusetts, have invented an Improvement in Fastenings for Horseshoes, of which the following description, in connection with the accompanying drawings, is a specification, like letters on the drawings representing like parts.

My invention relates to a fastening for horse shoes to be used as a substitute for nails now commonly employed. In a prior Patent No. 490,270, dated January 24, 1893, I have shown and described a fastening consisting of a band or bail that engages with the shoe at the sides of the hoof and passes substantially vertically over the front inclined portion of the hoof where it is engaged with a straining device having a base piece adapted to rest up and down the fore part of the hoof, and being provided at its lower end with prongs that penetrate the shell of the hoof from its upper surface toward it base.

The present invention is embodied in a fastening comprising a fastening bail operating substantially like the one just described, but in order to afford greater security in the fastening of the shoe the latter is in accordance with this invention provided with one or more holes or recesses, preferably passing through it from top to bottom at the toe end of the shoe, and the holding device that supports the bail is provided with a corresponding prong or prongs, to not only pass through the shell of the hoof but also to pass into the said hole in the shoe which is thus held securely from any sliding movement on the under surface of the hoof. As a base piece provided with a straining device such as shown in my former patent when placed on the hoof has its vertical position with relation thereto determined, it is necessary that the bail should be of just the right length to be tightened properly by the operation of the straining device. As it is sometimes difficult to get the fastening bail exactly the proper length the bail holding device is in accordance with this invention provided with means for holding the bail in strained condition at different points along its height, and to effect this result is provided with a series of teeth or shoulders upon any one of which the fastening bail may be set, said bail being properly strained by prying it up into engagement with a shoulder at the proper height to give the desired strain.

The construction of the pronged holding device and shoe before mentioned by which the latter is held against sliding movement on the under surface of the hoof does not depend upon the specific construction of the means for straining the bail or for holding it in strained condition, and may be employed in connection with a straining device such as shown in my former patent.

As a further means for preventing longitudinal movement of the shoe on the base of the hoof the fastening band instead of terminating in the side lugs of the shoe as shown in my former patent, is extended across the base of the hoof on the level just above the upper surface of the shoe, and enters recesses in the shell of the hoof which confine it against movement lengthwise of the base of the hoof. The fastening band thus extends wholly around the fore part of the hoof and the ends of the piece of wire may be fastened together in any suitable manner, preferably by twisting together the ends at or near the point where the wire engages with the holding device.

The invention further consists in other details which will be hereinafter described.

Figure 2:
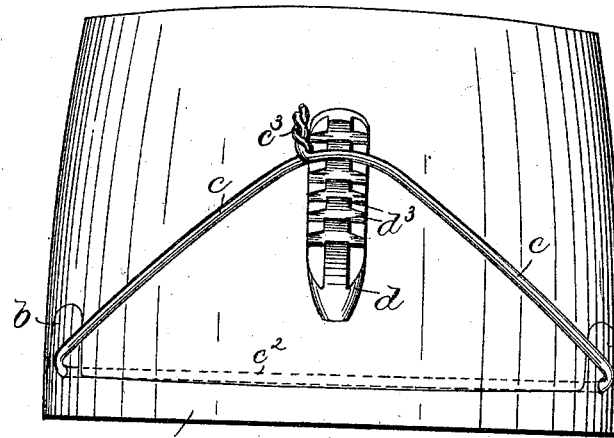
Figure 3:
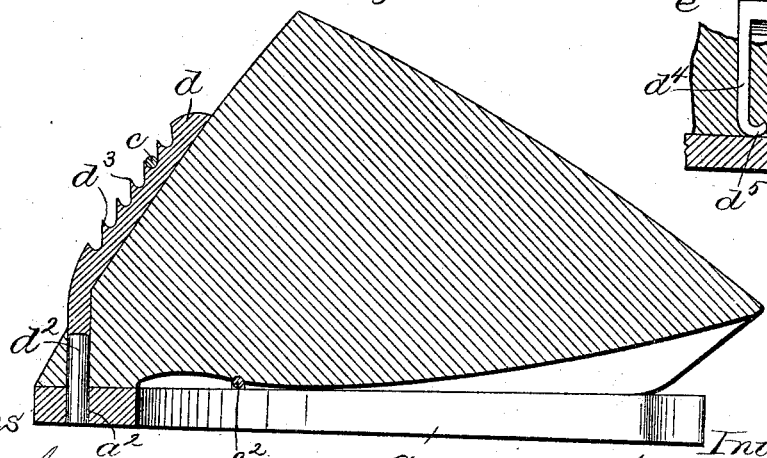

Figure 1 is a side elevation of a hoof provided with a shoe and fastening device therefor, embodying this invention; Fig. 2 a front elevation thereof; Fig. 3 a longitudinal vertical section, and Fig. 4 a sectional detail showing the base piece in front elevation provided with a straining device such as shown in my former application.

The shoe $a$ may be of usual construction except that it need have no nail holes, and said shoe is provided with lugs $b$, $b^2$, that engage with recesses in the edge of the hoof so as to properly position the shoe on the bottom of the hoof and to prevent lateral sliding movement of the shoe thereon, and said lugs being burned into the hoof in fitting the shoe thereto in the usual manner. In the invention forming the subject of the former patent these lugs $b$, $b^2$, were the sole reliance to prevent the shoe from slipping laterally on the bottom of the hoof in any direction, but as it is desirable to locate them somewhat forward of the widest part of the hoof, as will be recognized from Fig. 2, of the drawings in the present case, they do not afford a certain means for preventing the shoe from slipping forward although they prevent all possibility of the shoe slipping rearwardly or laterally. In order to equally insure against forward slipping and consequent loosening of the shoe it is in accordance with the present invention provided with one or more transverse recesses or perforations $a^2$ (see Fig. 3), at the toe end and the holding device $d$ for supporting the fastening bail (which holding device rests upon the hoof substantially like the base piece shown in my former patent) is provided with a corresponding prong or projection $d^2$ which not only penetrates the fore part of the shell of the hoof as shown, but also passes into the opening $a^2$ in the shoe, and thus securely retains the shoe in register with the bottom of the hoof, preventing all possibility of lateral movement in any direction when the shoe is held up against the under face of the hoof. As shown in this instance a single prong $d^2$ is used but it is obvious that two or more might be used, it being essential to this part of the invention only that one at least shall both pass through the shell of the hoof and into the opening of the shoe, and a single prong has been found sufficient and most convenient in practice. The shoe is held up against the bottom of the hoof by a fastening band or bail $c$ which may be a piece of stout wire passing through perforations in the lugs $b$, $b^2$, and extending up over the fore part of the hoof where it is engaged with and supported in properly strained condition by the holding device $d$. The fastening band or bail thus holds the shoe up against the under face of the hoof and it may also serve to prevent sliding movement of the shoe on the base of the hoof in which case the band instead of terminating at the lugs $b$, $b^2$, of the shoe as shown in my former patent, extends across the base of the hoof as shown at $c^2$ in Fig. 3, and in dotted lines in Fig. 2, the said wire lying just above the upper surface of the shoe $a$ as shown in Fig. 3, and entering a notch in the shell of the hoof. Such a notch may be produced by means of a wire inserted through the openings in the lugs $b$, $b^2$, and extending across the shoe which is heated when the shoe is heated to burn the lugs into the edges of the shell of the hoof, so that the wire also burns into the lower edges of the shell of the hoof, and thus forms the notch or recess for the wire $c$ employed for fastening the shoe to the hoof. With this construction the wire $c$ extends wholly around the fore part of the hoof and the ends of the wire may be united together in any suitable manner, for example, by twisting them as shown at $c^3$ Fig. 2.

In order to avoid the necessity of getting the bail of just the right length and to give the proper strain when drawn to a definite predetermined height on the holding piece $d$, the latter is constructed to engage and hold the bail at whatever height will give the proper strain to the said bail, the said holding device being provided with a series of holding shoulders or projections $d^3$ over any desired one of which the said bail may be placed. The said bail may be readily strained and thrown into engagement with the proper one of the shoulders $d^3$ by prying it up with a device similar to an ordinary screw driver placed under the middle of the bail and fulcrumed on the projection or shoulder of the fastening device on to which the bail is to be strained. If desired, however, a straining device such as used in my former patent may be used in connection with the pronged piece $d'$ that rests upon the fore part of the hoof with its pronged piece through the shell of the hoof and into or through a recess in the shoe, such a straining device being shown in Fig. 4, and consisting of a cam lever $e$ pivoted at $e^2$ on the base piece $d'$ and shown in this instance as provided with holes $e^3$ to receive the fingers of the wrench or spanner to facilitate the turning of the same. The upper end of said lever is deeply grooved as shown, to prevent possibility of the wire slipping off therefrom. When a straining device of this kind is used in connection with the wire extending under and wholly around the fore part of the hoof the ends of the wire may be twisted together over the straining device when the latter is turned down into position to leave the wire loose and by then turning the straining device to its normal position shown in full lines Fig. 4, the wire will be tightened so as to hold the shoe firmly against the hoof. If the fastenings should subsequently become loose the straining device can again be turned down to slacken the wire and a further twist can be given to its ends to shorten it slightly after which the wire so shortened can again be strained tightly by turning up the cam lever $e$ of the straining device.

Figure 4:
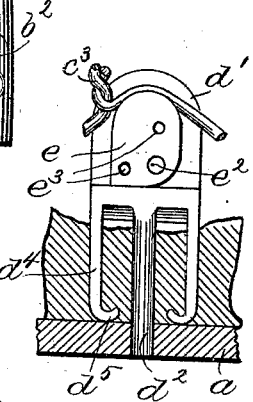

It is desirable that the bail holding device $d'$ or base portion thereof should be provided with one or more prongs $d^4$ best shown in Fig. 4, in addition to the prong $d^2$ that passes through the shoe, said additional prongs, or one of them, being long enough to pass downward through the shell of the hoof and be clinched thereunder as shown at $d^5$ so that in case the fastening bail should break or become detached the holding device $d'$ would still remain connected with the hoof and would thus not be lost or thrown off from the hoof. This construction is desirable also in connection with a holding device for a fastening such as shown in my former patent, which is not provided with a prong to engage with the shoe below the hoof.

I claim—

1. The combination of the horseshoe provided with side lugs or projections $b$, $b^2$, and a recess or perforation $a^2$ at its fore end, with the fastening band engaged with the said lugs of the shoe and adapted to extend up over the fore part of the hoof, and a band holding device adapted to rest upon the fore part of the hoof and provided at its lower end with a prong adapted to pass downward through an opening in the shell of the hoof and to enter the said opening $a^2$ in the shoe, said holding device being adapted to support said fastening band in strained condition, substantially as and for the purpose described.

2. The combination of the horseshoe provided with side lugs or projections $b$, $b^2$, with a fastening band engaged with the said lugs of the shoe and adapted to extend up over the fore part of the hoof, and a band holding device adapted to rest upon the fore part of the hoof and provided at its lower end with a prong adapted to pass downward through an opening in the shell of the hoof and to be clinched under the shell of the hoof, substantially as and for the purpose described.

3. The combination of the horseshoe provided with side lugs or projections $b$ and $b^2$, with a fastening band engaged with said lugs of the shoe and adapted to extend up over the fore part of the hoof, and a band-holding device adapted to rest upon the fore part of the hoof and provided at its lower end with a prong adapted to pass downward through the shell of the hoof, and along its upper part with a number of holding shoulders each adapted to engage with the fastening band, substantially as and for the purpose described.

4. The combination of a horseshoe provided with perforated side lugs or projections $b$, $b^2$, with a fastening band inserted through the perforations of said lugs, and adapted to extend across the lower face of the hoof in notches formed therein and up over the fore part of the hoof, and a band holding device adapted to be engaged with the fore part of the hoof and support the said band in strained condition, substantially as and for the purpose described.

In testimony whereof I have signed my name to this specification in the presence of two subscribing witnesses.

EDWARD T. COVELL.

Witnesses:
FRANK M. SPARROW,
A. EDWIN CLARKE.